Figure 1:
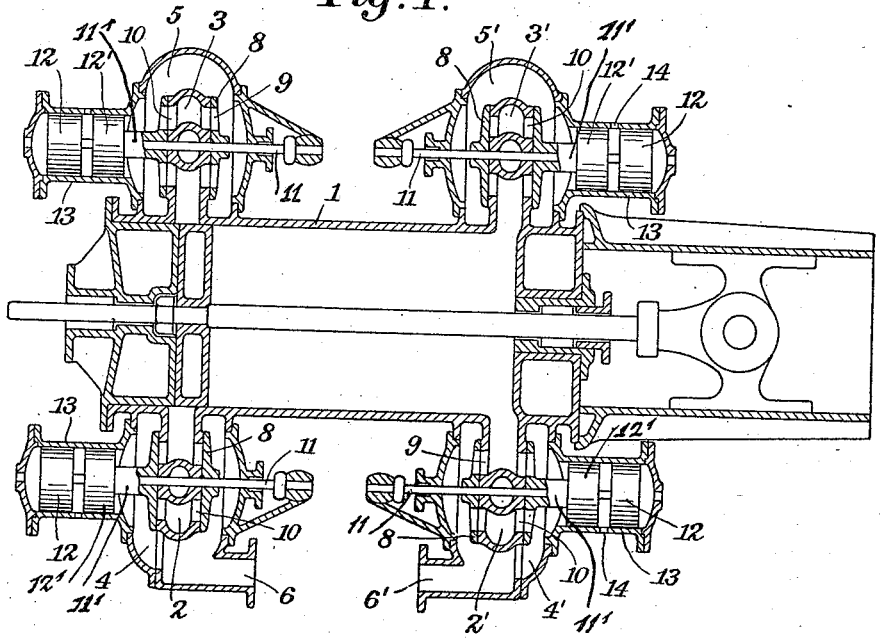

S. KOLOMYJSKI.
VALVE GEAR FOR RECIPROCATING STEAM AND OTHER ENGINES.
APPLICATION FILED AUG. 28, 1911.

1,066,289.

Patented July 1, 1913.

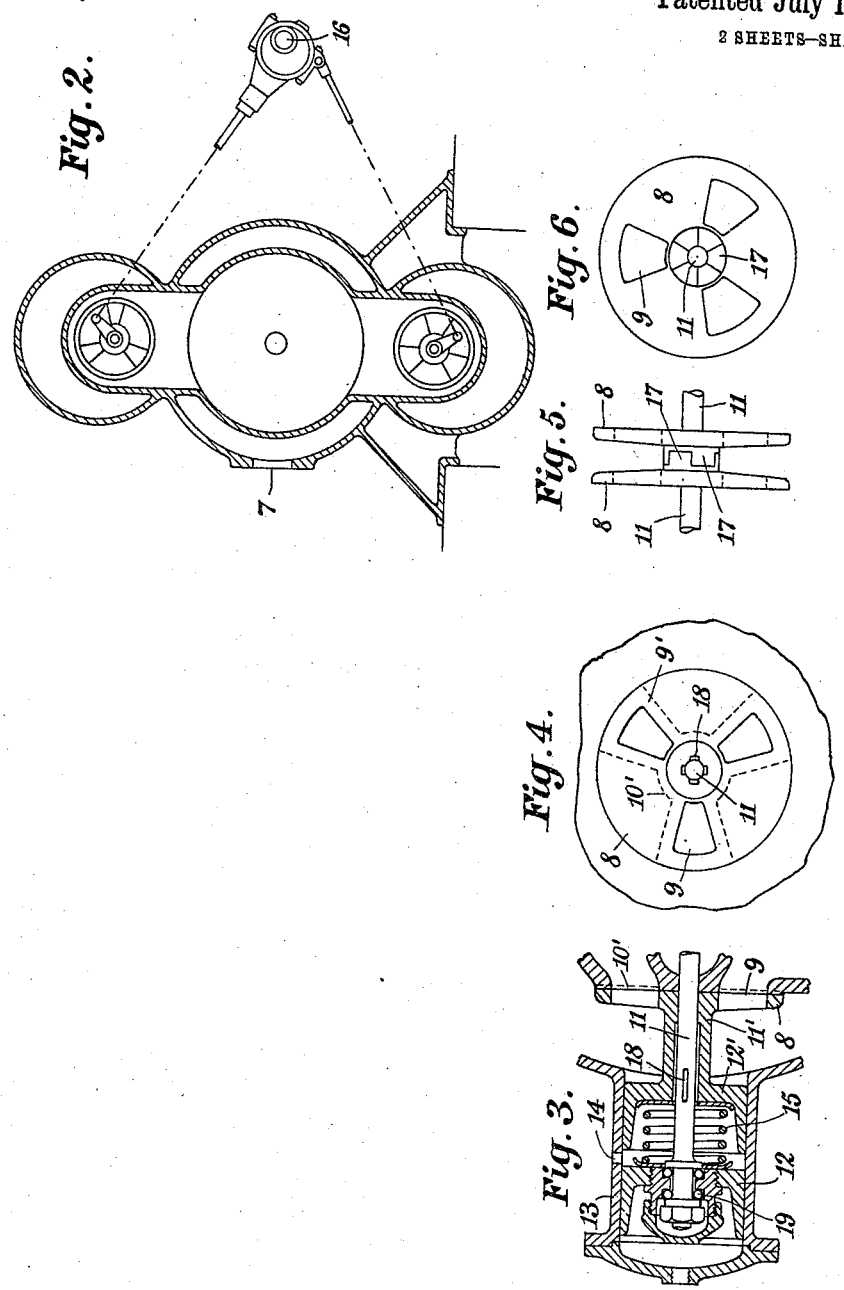

UNITED STATES PATENT OFFICE.

STANISLAS KOLOMYJSKI, OF ALEXANDROVSK, RUSSIA.

VALVE-GEAR FOR RECIPROCATING STEAM AND OTHER ENGINES.

1,066,289.   Specification of Letters Patent.   Patented July 1, 1913.

Application filed August 28, 1911. Serial No. 646,381.

*To all whom it may concern:*

Be it known that I, STANISLAS KOLOMYJSKI, a subject of the Czar of Russia, residing at Alexandrovsk, in the Empire of Russia, have invented certain new and useful Improvements in Valve-Gears for Reciprocating Steam and other Engines, of which the following is a specification.

This invention relates to an improved valve-gear for steam and other engines of the reciprocating type in which both the admission and exhaust-ports are provided with rotary valves that are located in special admission and exhaust-chambers, connected with the cylinder and actuated simultaneously by eccentrics located outside of the cylinder, and for this purpose the invention consists of a steam or other engine provided with admission and exhaust-chambers communicating with the working cylinder and provided with rotary valves for the inlet and exhaust-ports, and compensating devices for holding the rotary valves tightly on the faces or seats of the admission or exhaust-chambers; and the invention consists further of certain details of construction, which will be fully described hereinafter and finally pointed out in the claims.

The improved steam-engine is shown in the accompanying drawings, in which similar letters of reference denote corresponding parts in all the figures of the drawing, and in which—

Figure 7:
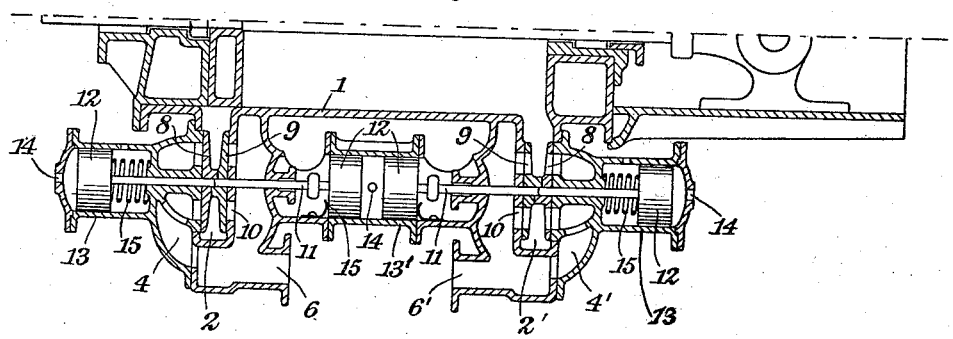

Figure 1 represents a vertical longitudinal section through the working steam or other cylinder, the admission and exhaust-chambers and the rotary valves with their compensating devices, Fig. 2 is a vertical transverse section, through the cylinder and the admission and exhaust-chambers, Fig. 3 is a detail vertical section, showing another form of compensator for the rotary valves, drawn on a larger scale, Fig. 4 is a detail side-elevation of one of the rotary valves, Fig. 5 is a side-view of two rotary valves coupled together, and located at the inside of the admission or exhaust-chamber, Fig. 6 is a side-view of one of the rotary valves, shown in Fig. 5 and Fig. 7 is a vertical longitudinal section of one-half of the engine, showing a modified construction of the rotary valves and their compensating devices.

As before mentioned, the essential feature of the invention consists in the use of a valve-gear with rotary valves in connection with a reciprocating steam or other power-cylinder for regulating the supply and exhaust of the steam to the cylinder. For arranging the rotary valves in proper manner on the working cylinder 1, special admission-chambers 3, $3^1$ and exhaust-chambers 2, $2^1$ are arranged at opposite sides of the cylinder. The admission and outlet-chambers are inclosed by cap-shaped casings 5, $5^1$ and 4, $4^1$ which are connected by channels concentrically with the cylinder respectively with the admission-port 6 and the exhaust-port $6^1$. The rotary valves 8 which are arranged in the admission and exhaust-chambers 3, $3^1$ and 2, $2^1$, are made in the form of flat disks, as shown in Figs. 4 and 6, and are provided with a number of radially-arranged openings 9. The side-walls of the admission and exhaust-chambers are likewise provided with corresponding openings 10 so that by the oscillations of the rotary valves 8, the openings 9 of the same either register with the openings in the admission and exhaust-chambers 3 and 2 so as to permit the supply of the pressure-medium, or are placed out of register with the said openings so as to shut off the supply of the pressure-medium.

For permitting the free and unobstructed admission and exhaust of the steam or other pressure-medium, the openings 10 are preferably arranged at each side of the chambers 3, $3^1$ and 2, $2^1$ so that on each side-wall of said chambers a rotary valve 8 has to be employed, as shown clearly in Fig. 1. The rotary valves 8 can either be located on the outside of the admission-chambers 3, $3^1$, as shown in the upper and lower parts of Fig. 1, or on the inside of the same, as shown in Fig. 7. Whatever be the position of the rotary valves relatively to the faces or seats of the admission or exhaust-chambers respectively 3, $3^1$ or 2, $2^1$, the faces of the slide-valves would be influenced disadvantageously under the influence of the pressure-medium, that is to say, they would in one case be liable to be moved away from the faces, and in the other case pressed against the same. For preventing irregularities and untightnesses between the rotary valves and their faces, compensating-devices have to be employed which can be constructed in different ways, but which by preference are made in the form of pistons. The rotary valves 8 are connected by rods 11 with compensating-pistons 12 which are located at each side of the admission and exhaust-chambers 2 and $2^1$ as shown in Fig. 1, or at both sides of the chambers 2, $2^1$, respectively 3, $3^1$, as shown in Fig. 7. Each compensating piston 12 is guided in a special cylinder 13, but the inner cylinders for the two pistons 12 which are located adjacent to each other between the exhaust-ports are preferably united into one cylinder 13. The piston-cylinders 13 are provided with openings 14 back of the pistons or between the same for permitting the admission of the pressure-medium which is either supplied from the working cylinder 1 in which case an equilibrium of pressure of the pressure-medium on the faces of the rotary valves with the pressure in the working cylinder is obtained, or any other source of energy, such as compressed air, gas or any other medium may be employed for producing the required degree of compensation. The pistons 12 are further acted upon by helical springs 15, which serve for the purpose of pressing the rotary valves tightly on the faces of the seats of the admission or exhaust-chambers when the pressure-medium for producing compensation is not available, as for instance, when the engine is to be started. The compensating devices may, however, also be located at one side of the admission or exhaust-chambers. Such an arrangement is shown in the upper and lower parts of Fig. 1, and in detail in Fig. 3. In this case the compensating pistons 12, $12^1$ for the rotary valves of the respective admission or exhaust-chambers are located at the ends of piston-rods 11, $11^1$, of which the piston-rods 11 is located within the tubular piston-rods $11^1$. Between both pistons, which are located in the cylinder 13, is arranged a helical spring 15 and an opening 14 for admitting the pressure-medium used to the compensating pistons so that by the same one piston is forced in outward and the other in inward direction, whereby the pressure on the faces of the rotary valves is equalized.

As for each admission, respectively, exhaust-chamber, eventually two or more rotary valves may be used, it is necessary to actuate them by suitable means, such as eccentrics and connecting-rods, from a governing-shaft 16 by which every pair of rotary valves is actuated in the same direction. This is accomplished, when the rotary valves are located as shown in Fig. 7 and in Figs. 5 and 6, at the inside of the admission or exhaust-chambers, simply by providing the hubs of the rotary valves at their adjacent faces with interlocking lugs 17 so that when one valve is oscillated the other has to take part in the oscillating motion. This connection or coupling of the valves can, however, also be produced in the manner shown in Fig. 3, in which the interior piston-rod 11 is provided with a key 18, which engages with a corresponding interior groove or keyway 20 at the inside of the tubular piston-rod $11^1$ so that while the pistons 12, $12^1$ can be shifted longitudinally relatively to each other, at the moment when one of the piston-rods is turned for oscillating the corresponding rotary valve, also the other piston-rod and with the same the other rotary valve has to take part in the oscillating motion. In this form of connection of the piston-rods, the piston-rod 11 is preferably connected with the piston 12 by means of a ball-bearing 19 shown in Fig. 3 so that the piston 12 can be shifted longitudinally without participating in the oscillation of the piston-rod 11.

I claim:

1. A valve-gear with rotary valves for steam and other engines with reciprocating pistons, comprising a cylinder, admission and exhaust chambers at opposite sides of said cylinder, rotary valves arranged in pairs on the faces of said chambers, compensating devices, one for each of said rotary valves, means for imparting rotary reciprocating motion to the latter, and auxiliary pressure means acting on said compensating devices for applying pressure to the rotary valves.

2. A valve-gear with rotary valves for steam and other engines with reciprocating pistons, comprising a cylinder, admission and exhaust chambers at opposite sides of said cylinder, rotary valves arranged in pairs on the faces of said chambers, compensating devices, one for each of said rotary valves, means for imparting rotary reciprocating motion to the latter, and auxiliary springs acting on the compensating device of each valve for supplying pressure to the rotary valves independently of the compensating devices.

3. A valve-gear with rotary valves for steam and other engines with reciprocating pistons, comprising a cylinder, admission and exhaust chambers at opposite sides of said cylinder, rotary valves arranged in pairs on the faces of said chambers, compensating devices for said rotary valves, means for imparting rotary reciprocating motion to the latter, and coupling means for each pair of rotary valves for producing the simultaneous rotation of both valves of each pair.

In testimony that I claim the foregoing as my invention, I have signed my name in presence of two subscribing witnesses.

STANISLAS KOLOMYJSKI.

Witnesses:
C. KOSSOLADSKI,
AUG. MIGHIS.